United States Patent [19]

Kind

[11] Patent Number: 5,377,847
[45] Date of Patent: Jan. 3, 1995

[54] DEVICE FOR SEPARATING METAL PARTICLES FROM A FLOW OF MATERIAL

[75] Inventor: Guntram Kind, Gummersbach, Germany

[73] Assignee: Pulsotronic Merten GmbH & Co. KB, Gummersbach, Germany

[21] Appl. No.: 16,331

[22] Filed: Feb. 11, 1993

[30] Foreign Application Priority Data

Feb. 12, 1992 [DE] Germany .............. 9201767[U]
Feb. 14, 1992 [DE] Germany .............. 9201851[U]
Mar. 7, 1992 [DE] Germany .................. 4207348

[51] Int. Cl.⁶ ............................................. B07C 9/00
[52] U.S. Cl. ......................................... 209/655; 209/657
[58] Field of Search ............... 209/552, 567, 570, 571, 209/655, 656, 657

[56] References Cited

U.S. PATENT DOCUMENTS

| | | |
|---|---|---|
| 2,045,769 | 6/1936 | Geffcken et al. . |
| 2,444,751 | 7/1948 | Scott . |
| 3,655,039 | 4/1972 | Kind et al. .............. 209/655 X |
| 3,776,675 | 12/1973 | Veneria .................. 209/655 X |
| 4,480,753 | 11/1984 | Thomas et al. .............. 209/657 X |

FOREIGN PATENT DOCUMENTS

| | | |
|---|---|---|
| 0202356 | 5/1985 | European Pat. Off. . |
| 0143231 | 6/1985 | European Pat. Off. ............ 209/570 |
| 0266309 | 10/1987 | European Pat. Off. . |
| 929046 | 7/1949 | Germany . |
| 2456680 | 12/1976 | Germany . |
| 1809982 | 4/1977 | Germany . |
| 2944192 | 9/1982 | Germany . |
| 3150503 | 8/1983 | Germany . |
| 3823356 | 1/1990 | Germany . |
| 3931579 | 9/1990 | Germany . |
| 3305268 | 1/1991 | Germany . |
| 3929709 | 3/1991 | Germany ............ 209/655 |
| 4017274 | 12/1991 | Germany . |

*Primary Examiner*—David H. Bollinger
*Attorney, Agent, or Firm*—Spensley Horn Jubas & Lubitz

[57] ABSTRACT

A device for separating metal particles from pulverized, granular or lumpy material to be conveyed, and in particular ground material or granules. The device includes a metal detector module for detecting metal particles, a selector module for separating metal particles, and, if necessary, a closing module to interrupt the material flow. The modular components enable different devices to be easily assembled in a variety of different sequences depending upon the corresponding application.

23 Claims, 5 Drawing Sheets

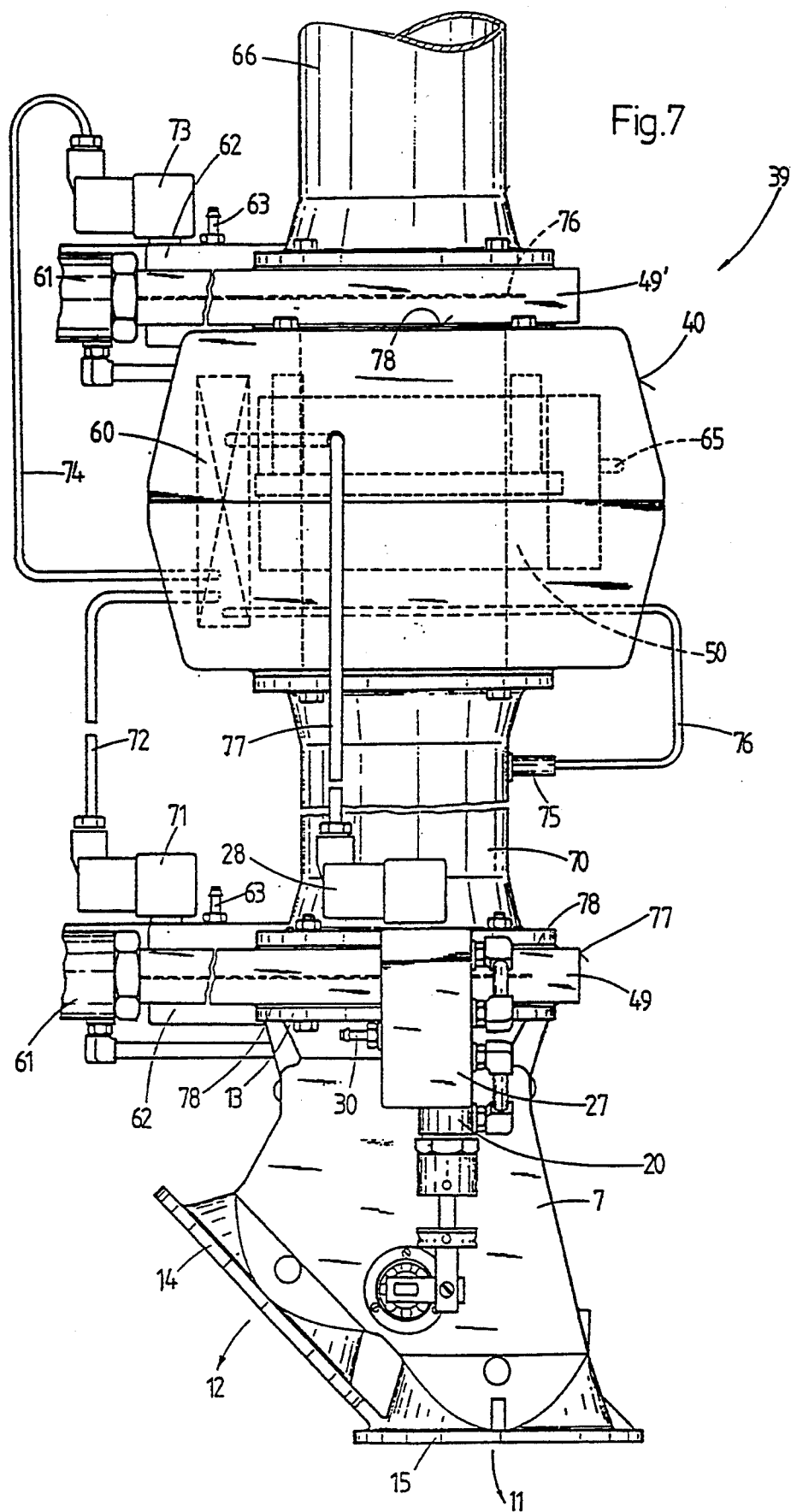

DEVICE FOR SEPARATING METAL PARTICLES FROM A FLOW OF MATERIAL

BACKGROUND OF THE INVENTION

1. Field of the Invention

The invention relates to a device for separating metal particles from a flow of material consisting of pulverized, granular, or lumpy material to be conveyed.

2. Description of Related Art

By DE-PS 18 09 982, a sorting selector for plastics, in particular for ground material, actuated by a metal detector and comprising a pivotably supported guide body and an actuating element has become known, wherein the channel-like closed guide body, particularly tube section, with its end adjacent to the metal detector, is suspended in a housing receiving the metal detector and, controlled by the metal detector, is alternately held over a trouser leg-like aperture of the housing, respectively. The known device wherein the material to be conveyed passes the selector freely falling is suitable for separating metal particles.

The device has proved itself in practice; owing to its construction, however, it cannot be used with a pneumatic pressure or vacuum conveyor system, wherein very high transport speed, discontinuous transport and transport stops may arise. Further, the device cannot be directly connected to the material connection piece of a processing machine such as a pressing or injection moulding machine, since, in case of a pile-up of the material to be conveyed, the selector becomes inoperative (choked).

This disadvantage has been avoided by German Patent 33 05 268. The device has been specially designed for being connected to the feeder connecting piece of a pressing or injection moulding machine and it separates the material to be conveyed "in portions", either in a good side, or, if metal particles are contained therein, in the bad side of the device. With low transport speeds, the device works excellent. It comprises a closing element which is rigidly coupled to the separating element, which closing element is configured as a slide. The closing element is configured to prevent a pile-up of the material to be conveyed back to the metal detector. The known device, however, is not adapted for such application wherein the material to be conveyed passes the device freely falling.

In contrast to German Patent 33 05 268, German Patent Application 39 29 709 discloses a closing element, in this case a squeezing valve, which is formed independently of the selecting member as a separate construction unit and opened or closed depending on the level of the selecting member so that the material to be conveyed can pass the metal detector freely falling in the filling phase. By means of this device, metal particles can be separated with very great certainty.

In this context, it is referred to the following patents or patent applications referring to devices for separating metal particles and operating with a selector, a metal detector and, if necessary, a closing element: German Patents 9 29 046, 24 56 680, 29 44 192, 31 50 503, 39 31 579, German Patent Applications 38 23 356, 40 17 274, European Patents 202 356, 266 309, U.S. Pat. Nos. 2,045,769, 2,444,751.

It is an object of the invention to provide a device for separating metal particles, which can be easily adapted to different applications.

SUMMARY OF THE INVENTION

According to the invention, the structural elements selector, metal detector, and, if necessary, closing element, are structurally separated and standardized to modules so that it is possible to easily assemble optionally devices for different applications or operational conditions with the same standard structural units selector, metal detector, and, if necessary, closing element. Thereby, different applications or operational conditions are to be defined as follows, for example: Conveyance of the material to be conveyed freely falling, in a vacuum or pressure conveyor system, with high or low transport speeds, in case of transport stops or discontinuous transport; devices with a high separating rate even with low transport speeds; devices to be mounted directly on the material connecting piece of a processing machine such as a pressing or injection moulding machine.

The invention is based on the principle that in order to cover all applications, the three basic elements, namely selector, metal detector, and closing element have so far always been configured for only one special application. With respect to development and construction, material management, manufacture and storing, this requires considerable effort. With this in mind, it has been deduced, according to the invention, that it is possible to assemble a device which can be adapted to each application with at least two basic modules with modular design, which devices are only different as to the assembling sequence and perhaps the number of modules. Then, only corresponding measures with respect to the manner of connection have to be provided for the functioning and cooperation of the modules, which are to be configured as standardized electrical, electronical, pneumatic, or hydraulic switch, control and adjusting elements.

For a first and simple application, namely the separation of metal particles from a flow of material to be conveyed, which has to pass the device freely falling (pressureless), a device composed of the selector module and the metal detector module is sufficient. In this most simple application, a filling funnel is mounted at the inlet aperture of the metal detector module, in which filling funnel the material to be examined is thrown, which comes out of the device again, the metal detector detecting a metal particle passing and activating the actuating mechanism for the selector module, which actuates the selecting member such as slide, plug of a cock, or flap and leads the material to be conveyed through the outlet aperture, the so-called bad side, until the metal particle is separated.

Due to the fact that the connections at the inlets and outlets of the individual modules uniformly match each other, the modules can be connected in an optional sequence either directly or via adaptors. The connections of the inlets and outlets do not necessarily have to be equally formed but they also may be formed complementarily. Preferably, however, these connections are equally formed, e.g. as flanges, the flange holes being arranged such that two opposed flanges may be connected. Since the connections match each other, a metal detector can be directly connected to a selector module at each of its connections. On the other hand, it is possible to connect metal detector modules to optional connections of the selector module. Preferably, a self-contained closing module is provided which also can be connected to optional connections of the selector module and/or metal detector module.

Advantageously, the selector module is provided with a guiding flap which, due to its low mass, permits a very high operational speed. The shaft of the guiding flap may be unilaterally supported at the selector module housing side facing the actuating mechanism, and protrude, with a free end, into the housing onto which the guiding flap is mounted.

Further, the housing of the selector module may be configured to be dustproof, whereby in the region of opposite walls of the inlet aperture of the selector module rubber-resilient skirts depending into the housing are arranged, which, in the end positions of the guiding flap, cooperate with the free end of the guiding flap, i.e. they are in sealing abutment. Advantageously, the skirts are spaced from the side walls of the housing and consist of soft rubber, natural rubber, or a soft elastic plastic material, such as nitril-butadien-rubber (NBR), so that clamped material particles are pressed into the soft skirt and do not create a considerable gap between the skirt and the guiding flap.

In another application, namely the integration of the device in a conveyor system, e.g. a vacuum or pressure conveyor system, or in case that the device is directly mounted on the filling connection piece of a processing machine such as a pressing or injection moulding machine, a material pile-up or transport stop may arise in case of irregular processing speed. With this device, it is possible, depending on the material take-off in the machine connection piece, to interrupt the material flow by means of the closing module, so that a material pile-up back to the selector module is prevented. For this purpose, it is possible to provide for a collection container at an outlet aperture, actually at the good side of the selector module. With its other side, the collection container may be connected to a conveyor system (vacuum or pressure conveyor system) or directly to the filling connection piece of a processing machine. Preferably, a sensor is arranged at the collection container, which sensor is connected to the circuit arrangement in the metal detector module via a line. By means of the mentioned circuit arrangement, the output signals produced by the metal detector and the sensor at the collection container are processed and the closing element and the actuating mechanism of the selector module are activated. When the level in the collection container reaches the sensing mark, the sensor activates the closing element which interrupts the material flow until the level in the collection container has fallen.

A preferred embodiment of the invention permits an interruption of the material flow directly upstream of the selector module, so that shifting of the guiding flap is not effected under load.

Another preferred embodiment of the invention permits an examination "in portions" of the material to be conveyed in case of a corresponding control of the closing modules. In this case, two subsequent operation cycles are carried out, with a corresponding control of two closing modules. Initially, both closing modules are closed and there is no material to be conveyed between the closing modules. Then, in a next step, the first closing module, that is the one arranged upstream of the metal detector module, is opened until the piled up material has not yet or just reached the metal detector. At this moment, the first closing module is closed again. The material between the two closing modules either does not contain metal particles or it does so. The guiding flap of the selector module can be adjusted correspondingly and subsequently, the second closing module can be opened. After the material to be conveyed stored between the closing modules has left the selector module, the second closing module is closed again and the process starts anew. This arrangement permits a very reliable examination of the material to be conveyed, as the examined quantity of the material to be conveyed always passes the metal detector freely falling. Advantageously, a collection connection piece with a sensor is arranged between the closing module and the metal detector module, which sensor controls the opening and closing of the closing module depending on the level in the collection connection piece via the circuit arrangement.

Apart from the described embodiments of the invention, there exist further possibilities to achieve further improvements and applications by the mentioned modules. A further metal detector module, e.g., may be arranged on the bad side of the selector module, by which it is detected whether a metal particle detected by the first, metal detector module has actually left the device; if not, an error message may be given. It is easily possible to connect several metal detector modules in series containing metal detectors which act in different manners, e.g. a metal detector module with a metal detector that acts inductively and detects metal particles, and a metal detector module with a metal detector that acts capacitively and detects non-metallic impurities.

Further, two equally acting metal detector modules may be connected in series to measure the speed of a metal particle, thus achieving optimum activation of the selector module, so that as little material as possible is separated out when separating out the metal particle.

The invention may be applied for another purpose than separating metal particles, namely for the distribution of material to be conveyed. Thus, for example, it is possible to give a control mark from a silo in the material flow, which mark guides the material flow when passing the metal detector module, then, there is no longer differentiated between good side and bad side of the device.

BRIEF DESCRIPTION OF THE DRAWINGS

Hereinafter, several embodiments of the invention are described, by way of example, with respect to the drawings, in which:

FIG. 7 is a device consisting of a combination of selector module, metal detector module, and two closing modules.

DESCRIPTION OF THE PREFERRED EMBODIMENTS

Figure 1:
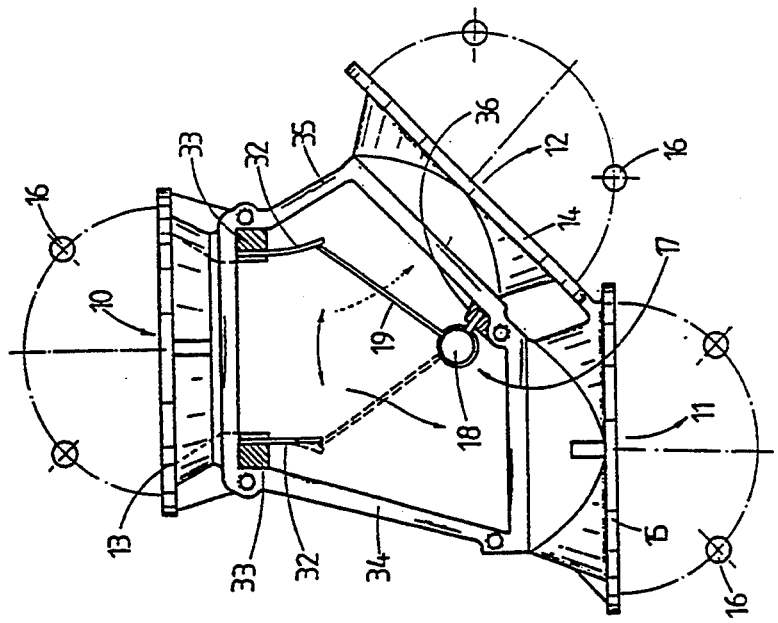
FIG. 1 is a total view of the selector module, with a guiding flap.
Figure 2:
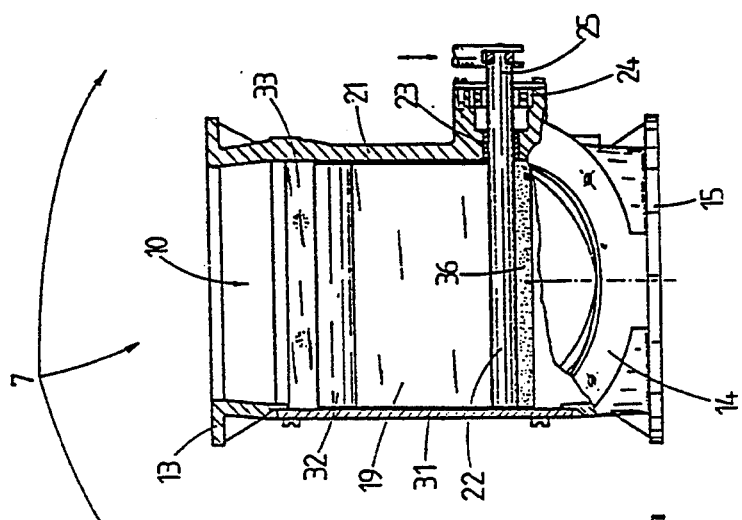
FIG. 2 is a partial sectional view of the selector module in the region of the guiding flap.
Figure 3:
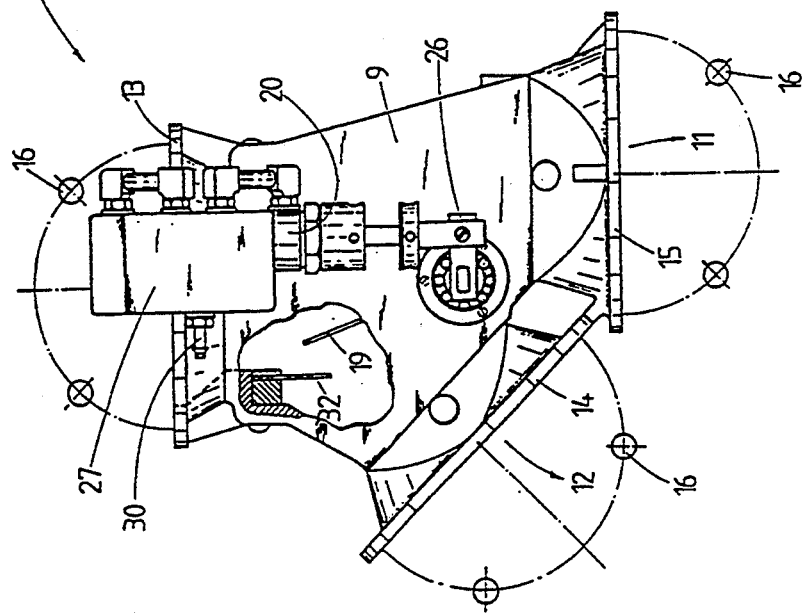
FIG. 3 is a total view of the selector module viewed from the side opposite to the one illustrated in FIG. 1.

FIGS. 1 to 3 illustrate the selector module 7. It consists of a housing 9, preferably an aluminum housing with an inlet aperture 10 and two outlet apertures 11,12 being opposite to the inlet aperture 10 and being arranged substantially in a trouser leg-like manner. The aperture 11 of the two outlet apertures 11,12 is called good side and the aperture 12 is called bad side, i.e. material to be conveyed flowing through the inlet aperture 10 into the selector module 7, e.g. plastic granule, flour, sugar and the like leaves the selector module through the good side if no metal particles are contained therein, and it leaves the selector module through the bad side if it is contaminated with a metal particle, in any case as long as the metal particle is not yet separated. Each aperture 10,11,12 has a mounting flange 13,14,15 with mounting holes 16, in the embodiment with four mounting holes 16, respectively. As can be seen from FIGS. 1 and 3, the two outlet apertures 11,12 form an asymmetrical wedge 17, in which the shaft 18 of the guiding flap 19 is arranged, as can be seen best in FIG. 3 of the drawings. The shaft 18 is unilaterally supported on the selector module housing side 21 facing the actuating mechanism 20 and configured as a carrier on two supports with a carrier arm 22 on which the rectangular guiding flap 19 consisting of sheet metal is mounted. The bearing pointing at the interior of the housing is formed as slide bearing 23 and the bearing arranged at the outer housing surface 21 is formed as roller bearing 24. Via a lever 26, the protruding shaft journal 25 is engaged by the actuating mechanism 20 which actuates the guiding flap 19, i.e. it is turned from a position closing the bad side 12 of the device in a position closing the good side 11, and vice versa. A pneumatic cylinder or a electromagnet being attached to the housing 9 along with its control unit 27 and connected to the circuit arrangement 60 disposed in the interior of the metal detector module 40 via an electrical plug connection designated with 28 in FIGS. 5, 6 and 7 in order to control the device functions as actuating mechanism 20. The pneumatic connection is effected on the fitting 30 of the control valve 27 of the actuating mechanism 20.

In the first position of the guiding flap (FIG. 3), there is no metal in the material to be conveyed during operation, and in the second position (shown in phantom lines), material to be conveyed contaminated by metal is separated. As soon as the metal particle has been separated, the actuating mechanism 20 returns the flap into its first position.

FIG. 3 permits an inside view of the selector module 7 with its cover 31 removed. It can be noted that the guiding flap 19 is arranged in the direction of the inlet aperture 10 of the device and abuts in each end position with its free end on a rubber-resilient skirt 32 depending freely into the housing 9. On the whole, two skirts are provided which are attached at the walls by means of strips 33 behind recesses of the housing 9. The skirts consist of a soft elastic material such as soft rubber, natural rubber, or plastics, e.g. nitril-butadien-rubber (NBR) and are arranged in spaced relationship with the walls 34,35 of the housing 9, so that the skirts 32 can adapt to the position of the guiding flap 19.

Thus, in each end position of the flap, dustproof closing of the respective aperture 11,12 is achieved, whereby granular or lumpy material particles clamped by the flap do no longer obstruct complete closing of the flap, which otherwise would have caused disturbances in the function of the flap. The gap between the flap and the housing walls can be closed by a Teflon seal.

The region between the separating plane of the two apertures 11,12 and the shaft 18 is sealed by a sealing strip 36 which is supported in a groove not specifically defined.

The selector housing wall 28 opposite to the shaft bearings 23,24 is closed by the detachable cover 31 mounted by screws, or by a flap. In case of an opened cover, this aperture functions as mounting or inspection aperture.

The metal detector module 40 comprises a box-shaped housing 41 with two equally formed housing halves 42,43, and is made of metal, preferably aluminium. The housing 41 comprises an inlet aperture 44 and an outlet aperture 45. Around the inlet aperture 44 and the outlet aperture 45, the housing is configured as mounting flange 46,47 with four thread holes 48. With the flanges 46,47, the metal detector module 40 can be connected to the selector module 7 or the closing module 49, as will be described in detail hereinafter.

In the interior of the housing 41, there is an annular, inductively acting metal detector 50 with integrated circuit electronics in the part 54 which, with its passage (not shown), is arranged in alignment with the housing apertures 44,45 and mounted to a mounting flange 51 on the upper housing half 42 by means of screws 52 and nuts 53. The metal detector 50 is adjusted approximately in the middle of the housing 41 by spacers 55. A plastic guide pipe 57 is located in the housing 41 and it extends from the inlet aperture 44 to the outlet aperture 45 and penetrates through the ring aperture of the metal detector 50. The material to be examined is directed through the guide pipe 57 and examined for metal particles by the metal detector 50. The guide pipe 57 is flush with the mounting flange 46,47 and has a not specifically defined shoulder at each end. With the shoulders, the guide pipe 57 respectively engages in a mounting ring 58, which is flush inserted in the flange 46,47 and comprises mounting holes 59 for being connected to the housing 41. The metal detector 50 as well as the guide pipe 57 may be exchanged for other metal detectors and guide pipes with different passage cross-section dimensions.

Figure 4:
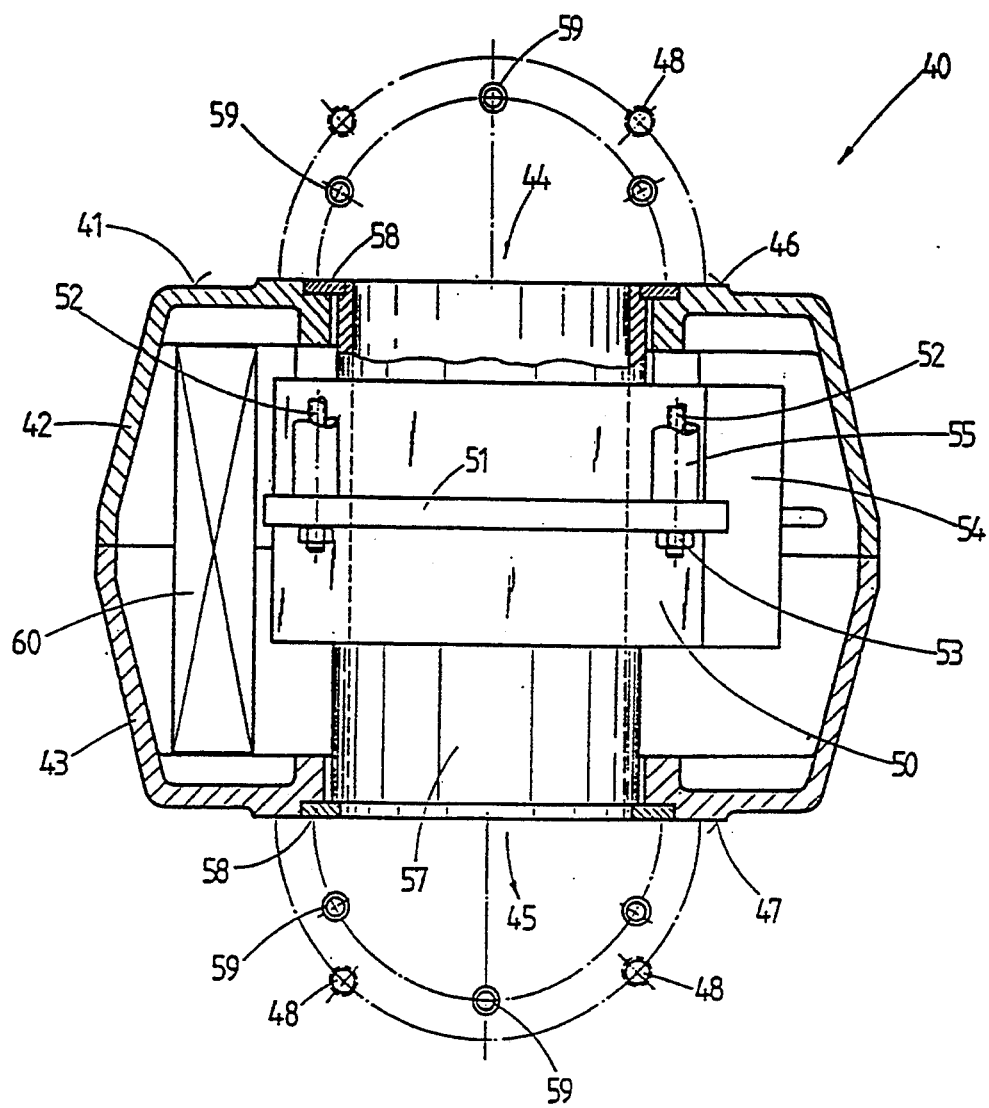
FIG. 4 is a cross-sectional view of the metal detector module.

In FIG. 4 in the left housing portion, there is a room for the circuit arrangement 60 of the device 37,38,39. The individual functions of this control electronics will be described hereinafter.

The closing module 49,49' is a slide 76 consisting of thin sheet material with a housing 77. Therefore, the slide will not be described in detail. The slide is connected to a pneumatic piston-cylinder-unit 61 (pneumatic cylinder) and controlled by the control valve 62. The pneumatic connection is effected to the fitting 63. It is noted that the actuating mechanism (pneumatic cylinder 61) and the control of the pneumatic cylinder (control valve 62) may have the same structure as in the case of the selector module 7. Moreover, a connection between the control valve 62 and the circuit arrangement 60 disposed in the metal detector module 40 can be established via an electrical plug device. The closing module 49 has mounting flanges 78 with not shown mounting holes, which flanges match with the mounting flanges 13,47 for the connection with the metal detector module 40 or the selector module 7. Instead of a flat slide as closing module 49,49', another closing element, e.g. a pneumatically actuated squeezing valve, may be used.

Figure 5:
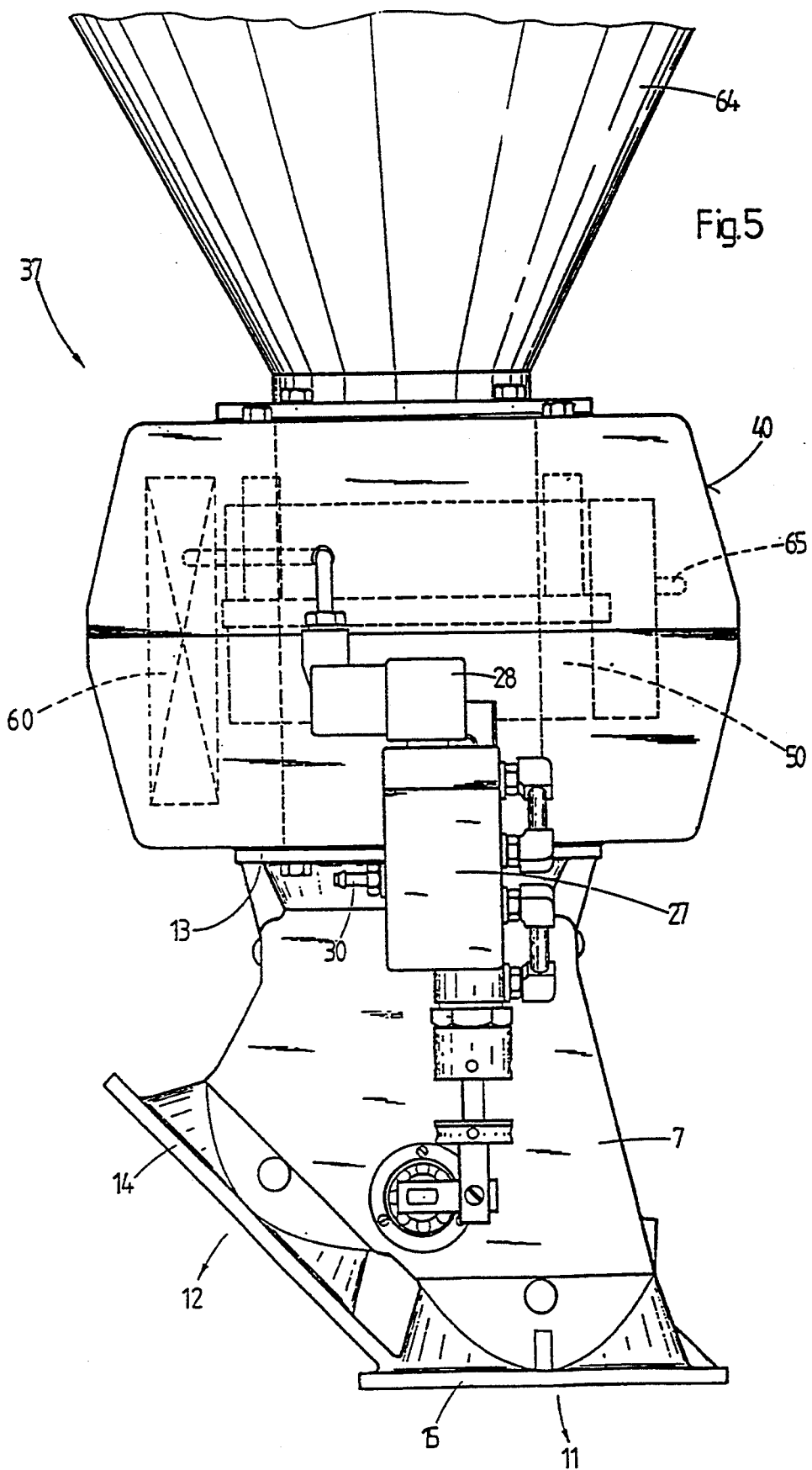
FIG. 5 is a device consisting of a combination of selector module and metal detector module, comprising a filling funnel.

The device 37 illustrated in FIG. 5 for separating metal particles is assembled of the selector module 7 and the metal detector module 40, which is arranged upstream of the selector module and to which a filling funnel 64 is connected. Via the plug connection 28, the actuating mechanism 20 (pneumatic cylinder) is connected to the circuit arrangement 60 disposed in the metal detector module 40, which circuit arrangement is connected to the output of the metal detector 50 via a line 65. The metal detector 50 detects the passage of a metal particle when passing the ring aperture and producing the circuit arrangement 60 actuates the electrical part of the pneumatic control part 27 via the plug connection 28. The actuating mechanism 20 pivots the guiding flap 19 out of its end position, in which it closes the bad side 12, into the other end position, in which it closes the good side 11. When the metal particle is separated, the circuit arrangement 60 returns the guiding flap back into its initial position.

Figure 6:
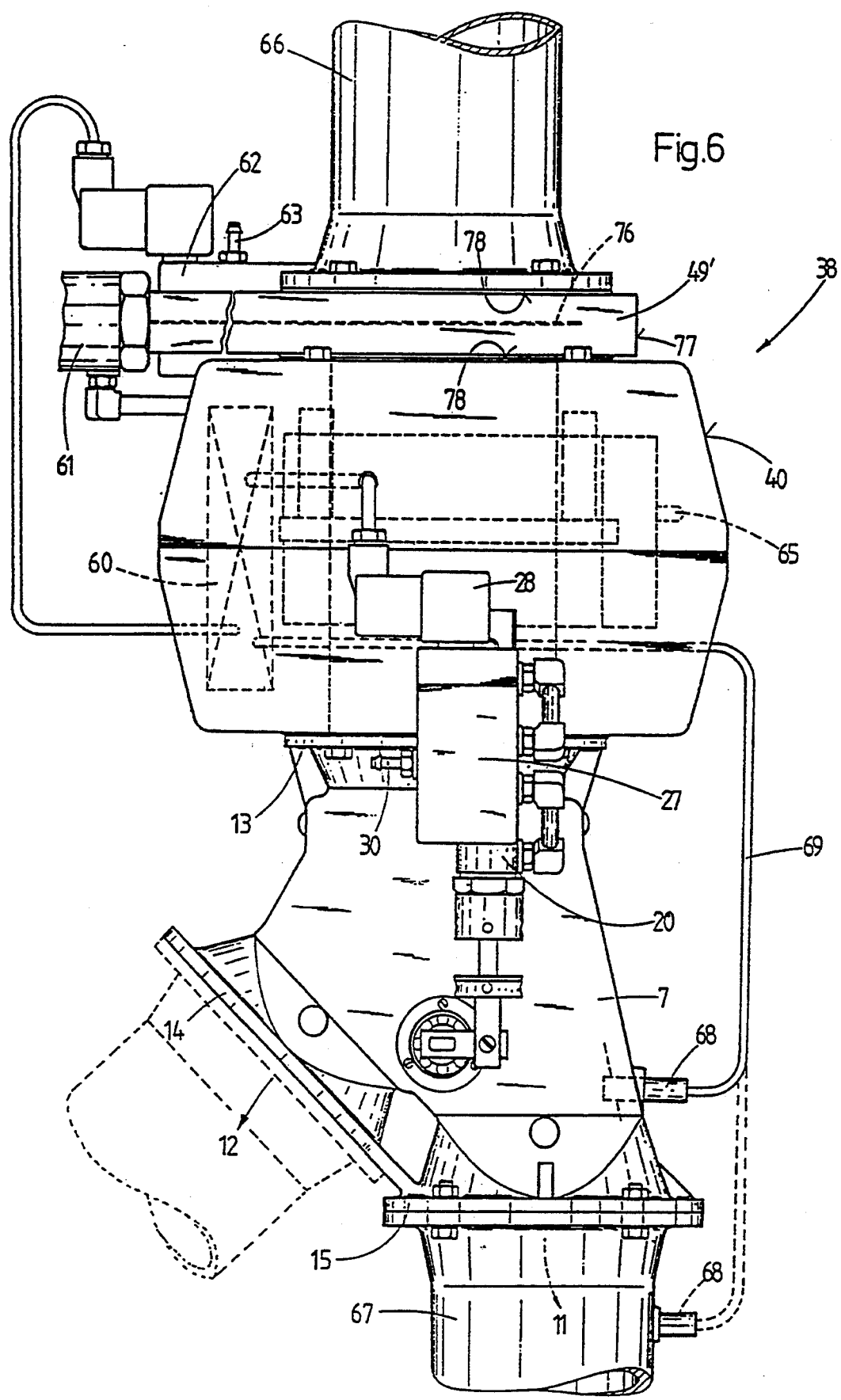
FIG. 6 is a device consisting of a combination of selector module, metal detector module, and closing module.

In the device 38 illustrated in FIG. 6, the closing module 49' is flanged upstream of the metal detector module 40. Via a not specifically defined control line with a plug device, which is not specifically defined either, the control valve 62 is connected to the circuit arrangement 60 in the metal detector module 40. The device 38 is connected to a conveyor pipeline 66 and not to a filling funnel. The lower connection piece 67 is to represent the machine connection piece of a pressing-injection moulding machine or the counterpart of the conveyor pipeline 66 or the connection piece of a collection container which intermittently stores the material to be conveyed. The material flow can be interrupted by the closing module 49' depending on the material take-out of the connection piece 67, so that a pile-up back to the selector module 7 is prevented. For this purpose, a sensor 68, e.g. a capacitively acting transducer, which is connected to the circuit arrangement 60 in the metal detector module 40 via the line 69, is arranged at the outlet aperture 11 of the selector module or directly at the connection piece 67. If the level in the connection piece 67 or in the outlet aperture 11 reaches the sensing mark, the sensor produces a control signal which activates the control valve 62 through the circuit arrangement 60 and actuates the pneumatic cylinder 61. Thereby, the material flow is interrupted by the slide 76 until the level in the connection piece 67 has fallen again.

The device 39 illustrated in FIG. 7 consists of the selector module 7, a closing module 49 connected to the inlet aperture 10 of the selector module 7, a collection connection piece 70 arranged between the first closing module 49 and the metal detector 40, and another closing module 49' connected to the mounting flange 47 upstream of the metal detector module 40. By this device 39, the material can be examined "in portions" in case of a corresponding control of the closing modules 49,49'. For this purpose, the second closing module 49 is connected to the circuit arrangement 60 in the metal detector module 40 via the plug device 71 and the line 72 as well as the first closing module 49' via the plug device 73 and the line 74. Furthermore, a sensor 75, preferably a capacitively acting transducer, which is connected to the circuit arrangement 60 via the line 76, engages with the collection connection piece 70. Depending on the level in the collection connection piece 70, which is surveyed by the sensor 75, the circuit arrangement controls both closing modules 49,49'. Further, the circuit arrangement controls the selector module 7 depending on the metal particles in the material detected by the metal detector module 40.

The device 39 of FIG. 7 operates as follows: Initially, both closing modules 49,49' are closed and there is no material to be conveyed in the collection connection piece or the material does not reach the control mark of the sensor 75. Then, the first closing module 49' is opened by the circuit arrangement 60. The collection connection piece 70 is filled up to the sensing mark of the sensor 75. The sensor output signal activates the circuit arrangement which issues a control command to the control valve 62 to close the first closing module 49'. If the metal detector module 40 has detected a metal particle during the passage of the material to be conveyed, the circuit arrangement is activated by a corresponding output signal of the metal detector module 40, which circuit arrangement activates the control valve 27 of the actuating mechanism 20 (pneumatic cylinder) of the selector module 7 via the line 77, whereby the guiding flap 19 closes the good side 11 of the selector module 7 and opens the bad side 12. After the guiding flap 19 has been actuated correspondingly, the second closing module 49 is activated and opened by the circuit arrangement. The contents of the collection connection piece 70 are separated through the selector module 7 through the outlet aperture 12 (bad side). If there is no metal in the material in the collection connection piece 70, the transport of its contents proceeds through the outlet aperture 11 (good side) of the selector module 7. Thereafter, the second closing module 49 is closed again. To separate as little material as possible through the outlet aperture 12 (bad side), the first closing module 49' may be closed by the metal detector module 40 via the circuit arrangement 60 already when the metal detector 50 has detected a metal particle in the material to be conveyed.

I claim:

1. A device for separating metal particles from a flow of material, the device comprising a substantially self-contained selector module comprising a movable selecting member and a selector housing including an inlet and at least two outlets, a substantially self-contained metal detector module comprising a metal detector for detecting the passage of a metal particle, control means for controlling the selecting member in response thereto and a detector housing including an inlet and an outlet, each of the inlets having connection means associated therewith for enabling connection between the inlet and at least one of the outlets, each of the outlets having connection means associated therewith for enabling connection between the outlet and at least one of the inlets, the connection means associated with each of the inlets and the connection means associated with each of the outlets having mutually matching structures, whereby the selector housing and the detector housing are assemblable in a plurality of different sequences to thereby form metal separators of different construction and operation.

2. The device of claim 1, wherein the material reaches a filling level substantially adjacent at least one of the outlets of the selector module, and further comprising:
a sensor for detecting the filling level reached by the material, the sensor being located substantially adjacent at least one of the outlets of the selector module.

3. The device of claim 2, comprising:
actuating means for closing the closing module, and
circuit means located in the detector housing and responsive to the sensor for activating the actuating means,
whereby the actuating means closes the closing module when the filling level reaches the sensor.

4. The device of claim 1, wherein the inlet and the outlet of the detector housing are in substantial alignment,
the inlet of the detector housing defining an edge portion configured as a connection flange with mounting holes,
the outlet of the detector housing defining an edge portion configured as a connection flange with mounting holes, and
a metal detector defining a passage arranged in the housing in substantial alignment with the inlet and the outlet of the detector housing.

5. The device of claim 4, comprising:
a plastic guide pipe extending from the inlet of the detector housing to the outlet of the detector housing through the passage of the metal detector.

6. The device of claim 1, comprising:
an actuating mechanism,
the selector housing having a side facing the actuating mechanism,
a rotatable shaft for supporting the selecting member of the selector module, the shaft being unilaterally supported at the side of the selector housing which faces the actuating mechanism, the shaft defining an unsupported free end which protrudes into the selector housing.

7. A device for separating metal particles from a flow of material, the device comprising
a substantially self-contained selector module comprising a movable selecting member and a selector housing including an inlet and at least two outlets,
a substantially self-contained metal detector module comprising a metal detector for detecting the passage of a metal particle, control means for controlling the selecting member in response thereto and a detector housing including an inlet and an outlet,
a substantially self-contained closing module comprising a closing housing including an inlet and an outlet,
the inlet of the closing housing having connection means associated therewith for enabling connection between the inlet and at least one of the outlets of the selector housing and the detector housing,
the outlet of the closing housing having connection means associated therewith for enabling connection between the outlet and at least one of the inlets of the selector housing and the detector housing,
the connection means associated with the inlet of the closing housing and the connection means associated with the outlet of the closing housing having mutually matching structures,
whereby the closing housing, the selector housing and the detector housing are assemblable in a plurality of different sequences to thereby form metal separators of different construction and operation.

8. The device of claim 7, wherein the flow of material defines an upstream direction and wherein the closing module is arranged upstream of the metal detector module.

9. The device of claim 7, wherein the material defines a filling level, and further comprising:
a sensor for detecting the filling level, and
circuit means located in the detector housing for controlling at least one of the selector module and the closing module, the circuit means being controlled by at least one of the metal detector and the sensor.

10. A device for separating metal particles from a flow of material, the device comprising:
a substantially self-contained selector module comprising a movable selecting member and a selector housing including an inlet and at least two outlets,
a substantially self-contained metal detector module comprising a metal detector for detecting the passage of a metal particle, control means for controlling the selecting member in response thereto and a detector housing including an inlet and an outlet,
a substantially self-contained closing module comprising a closing housing including an inlet and an outlet,
each of the inlets having connection means associated therewith for enabling connection between the inlet and at least one of the outlets,
each of the outlets having connection means associated therewith for enabling connection between the outlet and at least one of the inlets,
the connection means associated with each of the inlets and the connection means associated with each of the outlets having mutually matching structures,
whereby the selector housing and the detector housing are assemblable in a plurality of different sequences to thereby form metal separators of different construction and operation, wherein the closing module is arranged between the selector module and the metal detector module.

11. A device for separating metal particles from a flow of material, the device comprising:
a substantially self-contained selector module comprising a movable selecting member and a selector housing including an inlet and at least two outlets,
a substantially self-contained metal detector module comprising a metal detector for detecting the passage of a metal particle, control means for controlling the selecting member in response thereto and a detector housing including an inlet and an outlet,
a substantially self-contained closing module comprising a closing housing including an inlet and an outlet,
each of the inlets having connection means associated therewith for enabling connection between the inlet and at least one of the outlets,
each of the outlets having connection means associated therewith for enabling connection between the outlet and at least one of the inlets,
the connection means associated with each of the inlets and the connection means associated with each of the outlets having mutually matching structures,
whereby the selector housing and the detector housing are assemblable in a plurality of different sequences to thereby form metal separators of different construction and operation, and a collection connection member arranged between the closing module and the metal detector module.

12. The device of claim 11, wherein the material defines a filling level, and further comprising:

a sensor for detecting the filling level, the sensor being located substantially adjacent the collection connection member.

13. The device of claim 12, comprising:

actuating means for closing the closing module, circuit means located in the detector housing and responsive to the sensor for activating the actuating means, whereby the actuating means closes the closing module when the filling level reaches the sensor.

14. A device for separating metal particles from a flow of material, the device comprising a substantially self-contained selector module comprising a movable selecting member and a selector housing including an inlet and at least two outlets, a substantially self-contained metal detector module comprising a metal detector for detecting the passage of a metal particle, control means for controlling the selecting member in response thereto and a detector housing including an inlet and an outlet, each of the inlets having connection means associated therewith for enabling connection between the inlet and at least one of the outlets, each of the outlets having connection means associated therewith for enabling connection between the outlet and at least one of the inlets, the connection means associated with each of the inlets and the connection means associated with each of the outlets having mutually matching structures, whereby the selector housing and the detector housing are assemblable in a plurality of different sequences to thereby form metal separators of different construction and operation, wherein the inlet and the outlet of the detector housing are in substantial alignment, the inlet of the detector housing defining an edge portion configured as a connection flange with mounting holes, the outlet of the detector housing defining an edge portion configured as a connection flange with mounting holes, and a metal detector defining a passage arranged in the housing in substantial alignment with the inlet and the outlet of the detector housing, and further comprising:

a plastic guide pipe extending from the inlet of the detector housing to the outlet of the detector housing through the passage of the metal detector, and a mounting ring associated with the inlet of the detector housing and a mounting ring associated with the outlet of the detector housing, the mounting rings enabling centering of the guide pipe.

15. The device of claim 14, wherein the guide pipe is removable.

16. A device for separating metal particles from a flow of material, the device comprising:

a substantially self-contained selector module comprising a movable selecting member and a selector housing including an inlet and at least two outlets, a substantially self-contained metal detector module comprising a metal detector for detecting the passage of a metal particle, control means for controlling the selecting member in response thereto and a detector housing including an inlet and an outlet, a substantially self-contained closing module comprising a closing housing including an inlet and an outlet, each of the inlets having connection means associated therewith for enabling connection between the inlet and at least one of the outlets, each of the outlets having connection means associated therewith for enabling connection between the outlet and at least one of the inlets, the connection means associated with each of the inlets and the connection means associated with each of the outlets having mutually matching structures, whereby the selector housing and the detector housing are assemblable in a plurality of different sequences to thereby form metal separators of different construction and operation, wherein the flow of material defines an upstream direction and a downstream direction and further comprising:

a first closing module arranged upstream of the metal detector, a second closing module arranged downstream of the metal detector, the first closing module being open when the second closing module is closed, and the second closing module being closed when the first closing module is open.

17. The device of claim 16, wherein the material defines a filling level, and further comprising:

a collection connection member arranged between the closing module and the metal detector module, a sensor for detecting the filling level, the sensor being located substantially adjacent at least one of the outlet of the selector module and the collection connection member, the first closing module being closed when material in the collection connection member has reached a predetermined level as measured by the sensor, and the second closing module being opened when the selector module is adjusted in response to the detection by the metal detector of the presence of a metal particle in the collection connection member to one of the two outlets.

18. The device of claim 17, wherein the selector housing of the selector module comprises a first outlet and a second outlet and wherein the first closing module is closed when a metal particle passes the metal detector and the second closing module is opened when the second outlet of the selector housing of the selector module is open and the first outlet of the selector housing of the selector module is closed.

19. A device for separating metal particles from a flow of material, the device comprising a substantially self-contained selector module comprising a movable selecting member and a selector housing including an inlet and at least two outlets, a substantially self-contained metal detector module comprising a metal detector for detecting the passage of a metal particle, control means for controlling the selecting member in response thereto and a detector housing including an inlet 44 and an outlet, each of the inlets having connection means associated therewith for enabling connection between the inlet and at least one of the outlets, each of the outlets having connection means associated therewith for enabling connection between the outlet and at least one of the inlets, the connection means associated with each of the inlets and the connection means associated with each of the outlets having mutually matching structures, whereby the selector housing and the detector housing are assemblable in a plurality of different sequences to thereby form metal separators of different construction and operation, wherein the inlet of the selector housing defines opposite side walls, and further comprising rubber-resilient skirts arranged adjacent the opposite side walls and protruding into the selector housing.

20. The device of claim 19, wherein the skirts are arranged in spaced relationship with the side walls of the selector housing.

21. The device of claim 19, wherein the skirts comprise at least one of a soft rubber, a natural rubber and a soft elastic plastic material.

22. The device of claim 19, wherein the skirts comprise nitril-butadien-rubber (NBR).

23. A modular system for assembling a device for separating metal particles from a flow of material, comprising:

a selector module having a selector housing, a metal detector module having a detector housing, and a closing module having a closing housing, each of the housings having an inlet and an outlet, each of the inlets having connection means associated therewith for enabling connection between the inlet and at least one of the outlets, each of the outlets having connection means associated therewith for enabling connection between the outlet and at least one of the inlets, the connection means associated with each of the inlets and the connection means associated with each of the outlets having mutually matching structures, whereby the housings are mutually connectable, in optional sequences, to form metal separators of different construction and operation

* * * * *